UNITED STATES PATENT OFFICE.

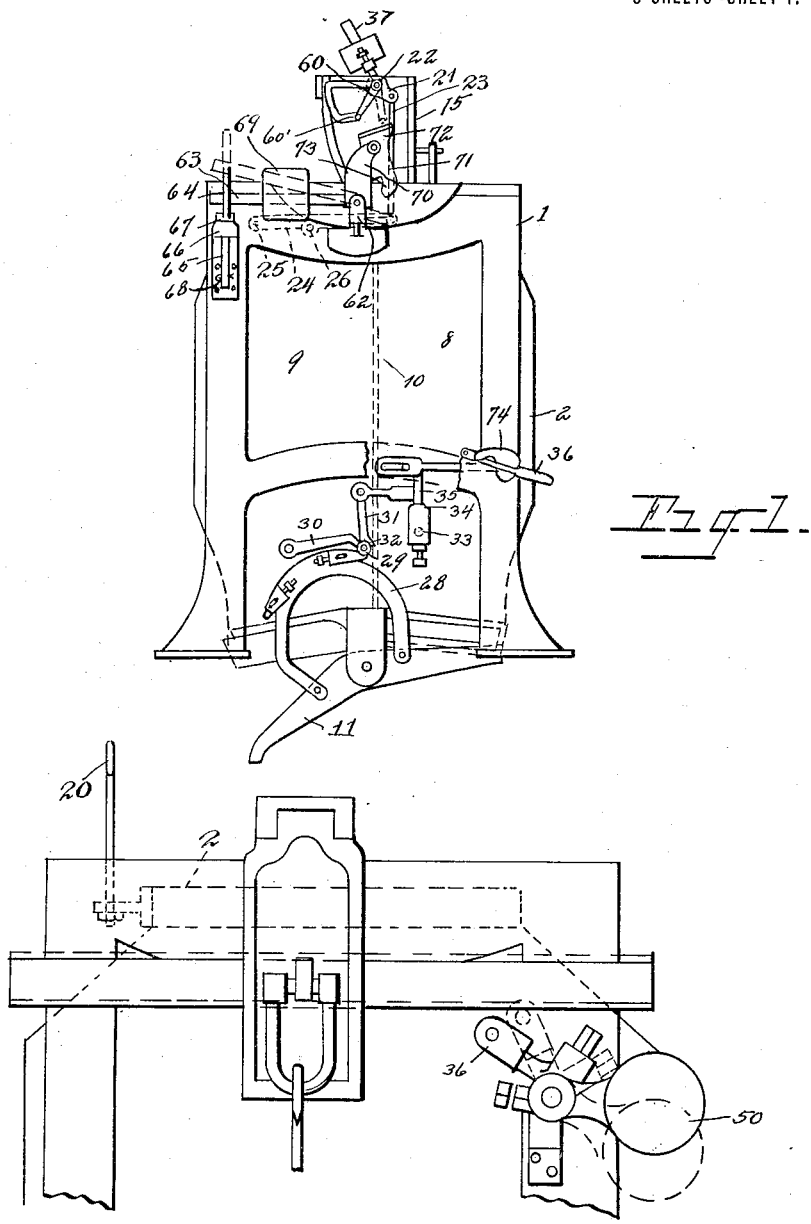

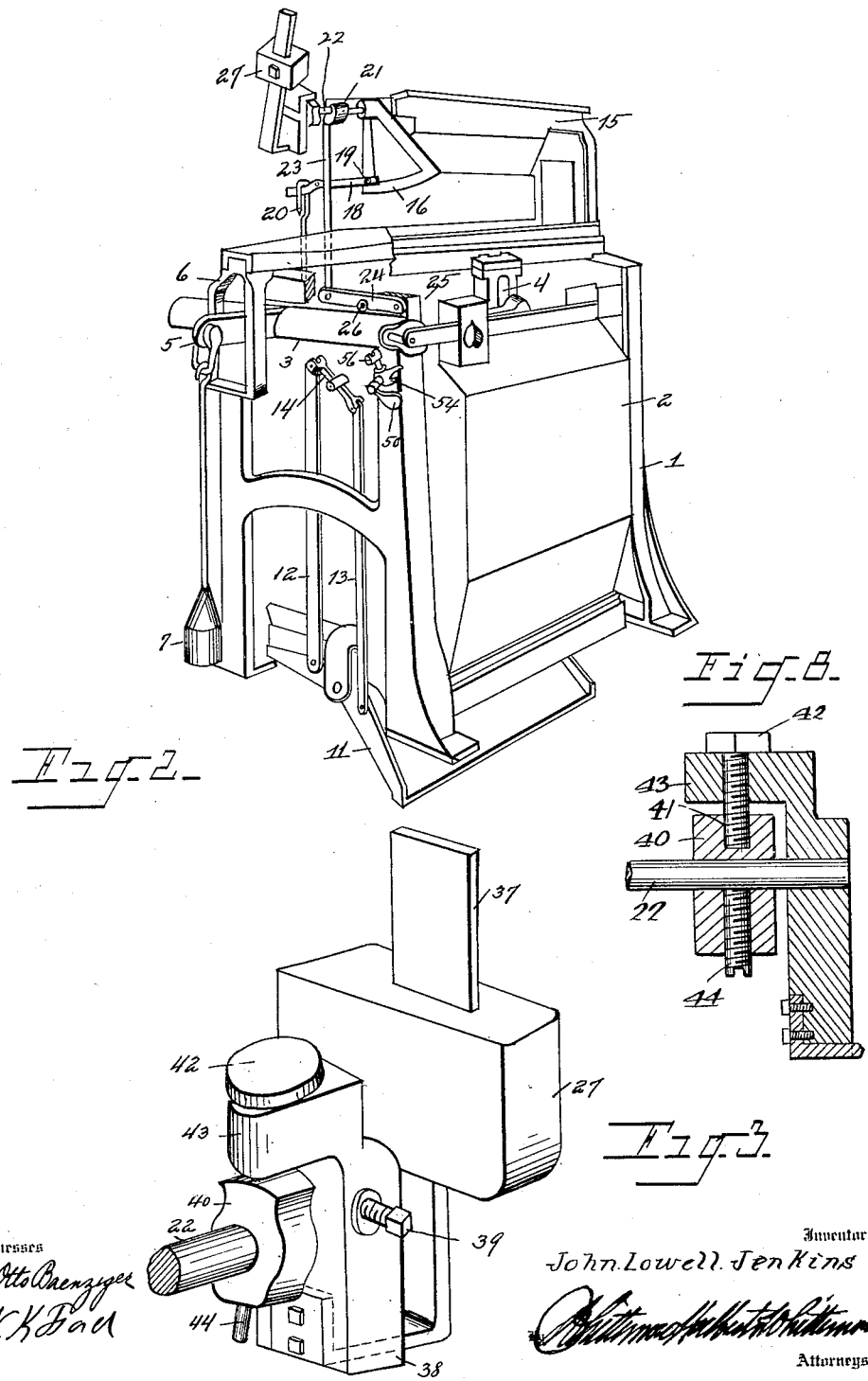

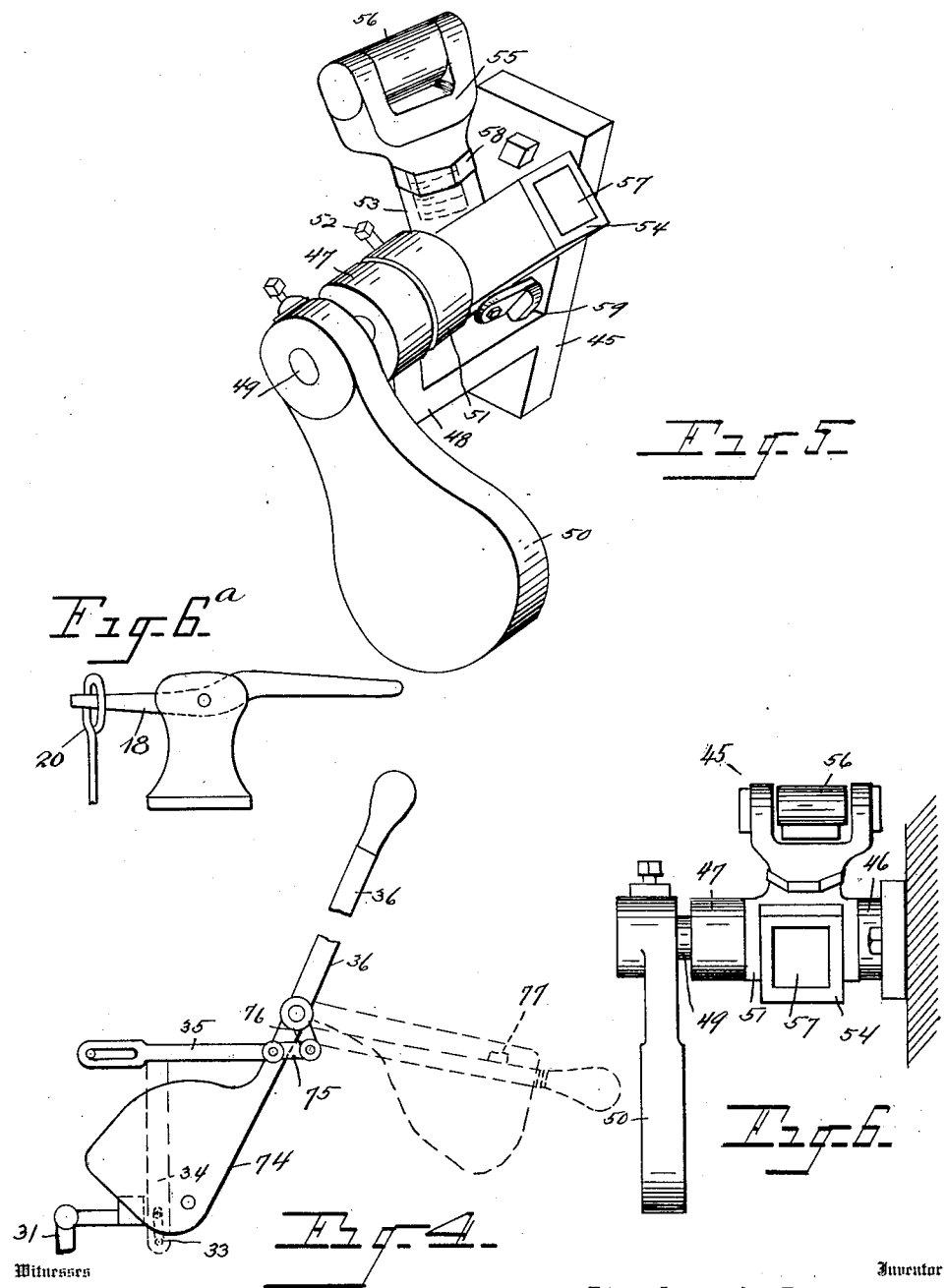

JOHN LOWELL JENKINS, OF ST. JOHNSBURY, VERMONT, ASSIGNOR TO E. & T. FAIRBANKS & COMPANY, OF ST. JOHNSBURY, VERMONT, A CORPORATION OF VERMONT.

AUTOMATIC SCALE.

1,154,402. Specification of Letters Patent. Patented Sept. 21, 1915.

Application filed February 19, 1912. Serial No. 678,625.

*To all whom it may concern:*

Be it known that I, JOHN LOWELL JENKINS, a citizen of the United States of America, residing at St. Johnsbury, in the county of Caledonia and State of Vermont, have invented certain new and useful Improvements in Automatic Scales, of which the following is a specification, reference being had therein to the accompanying drawings.

The invention relates to new and useful improvements in automatic scales, and more particularly to that type of scale in which the material to be weighed automatically controls the operations of the scale.

The invention resides in improved means for temporarily retarding or checking the movement of the weighing beam after a partial movement thereof when the scale is under a load; in the mechanism for overcoming the inertia of the beam upon its initial weighing movement; in the novel construction and arrangement of the weight for regulating the speed of closing of the cut-off gate and of the bracket for the weight; and in the means for locking the discharge gate of the scale receptacle in either its open or its closed position.

To this end, the invention consists in the peculiar construction, arrangement and combination of parts, as more fully hereinafter described and particularly pointed out in the claims.

In the drawings,—Figure 1 is an end elevation of a scale embodying my invention; Fig. 2 is a perspective view thereof; Figs. 3, 4, 5 and 6 are enlarged views illustrating certain details of construction; Fig. 6ª is a detail view showing the mounting of a tripping lever, which enters into the construction. Fig. 7 is a fragmentary elevation of the front end of the scale; Fig. 8 is a sectional detail view.

1 represents the frame of the scale, and 2 the weighing receptacle supported upon the weighing lever or beam 3, the latter being fulcrumed at 4 upon the frame and having the end 5 thereof passing through a trig loop 6 and carrying the weighted counterpoise 7. The weighing receptacle as herein shown is divided into two chambers 8 and 9 by the central partition 10, and the discharge ends of these chambers are controlled by a gate 11 so constructed that when one chamber is closed the other is open.

12 and 13 are links each having one end pivoted to the gate 11 and the opposite end pivotally connected to an even lever 14 on the receptacle.

Mounted upon the frame above the weighing receptacle is the feed hopper 15, the discharge opening of which is controlled in the usual manner by a swinging cut-off gate 16 having the usual dribble opening (not shown). A lever 18 pivoted upon the stationary frame is normally arranged in the paht of a stop 19 on the cut-off gate so as to arrest the movement of the latter when the gate is in its dribbling position, and a trip is provided for the lever 18 in the form of a member secured to the receptacle and having a loop portion 20 arranged over the outer end of the lever.

21 are crank arms fixedly secured to the shaft 22 carrying the cut-off gate. These crank arms are connected by means of links 23 to levers 24 pivoted at 25 to the frame 1, and levers 24 are adapted to engage rollers 26 upon the ends of the weighing receptacle.

The speed with which the cut-off gate closes is regulated by a weight 27, the detail construction and arrangement of which will be more fully hereinafter described.

Secured to one end of the discharge gate is a segment 28 having notched shoulders at its opposite ends with which a roller 29 on an arm 30 pivoted to the end of the weighing receptacle is adapted to engage, the construction of the notches and roller being such that the roller will be disengaged from the notches by a load in the receptacle. The roller is normally held in engagement with the notch by a counterweighted bell-crank lever 31 having a curved bearing portion 32 engaging over the roller, and this bell-crank is adapted to be rocked so as to disengage the bearing portion 32 from the roller 29 by means of a projection, such as a roller 33, upon an arm 34 depending from a slide 35; 36 is a lever rigidly attached to the slide 35 for shifting the slide so as to move the roller 33 out of operative relation to the lever 31, when it is not desired to automatically discharge the material from the compartments.

The construction so far described is not new in the art, but a brief description of the operation thereof will be given in order that the invention may be better understood.

When the weighing receptacle is empty, the levers 24 rest upon the rollers 26, thus transmitting the weight of the cut-off gate to the weighing receptacle. Assuming that the discharge gate is in position to close compartment 8 and that the lever 36 is adjusted for automatic dumping, as shown in full lines in Fig. 1, when the material discharging from the hopper into the chamber 8, together with the weight of the cut off gate, overcomes the weight of the counter-poise 7, the weighing receptacle lowers. The lowering of the receptacle permits the closing of the cut-off gate until the stop 19 abuts against the end of lever 18, which retards the cut-off gate in its dribbling position. Just prior to the engagement of the stop 19 with the lever 18, the rollers will lower away from the levers 24 and relieve the receptacle of the weight of the cut-off gate. When the desired amount of grain has entered the compartment through the dribbling opening, the receptacle will be lowered sufficiently to effect the tripping of lever 18, permitting the complete closing of the cut-off gate; substantially simultaneously with the closing of the cut-off gate the bell-crank lever 31 is rocked through the medium of the roller 33, allowing the weight of the grain to actuate the discharge gate 11, thereby opening the lower end of compartment 8; upon the discharge of the grain the parts are automatically restored to their normal position.

As before stated, the cut-off gate is provided with a weight 27 for varying the speed of closing thereof. This weight is adjustably mounted upon a bracket 37, which in turn is angularly adjustable in relation to the shaft of the cut-off gate. The bracket 37 is in the shape of a U, having one leg elongated, and upon which is adjustably sleeved the weight 27. The shorter leg is secured to a member 38 rotatively adjustable about the shaft 22 and held in its different positions of adjustment by a set-screw 39. To aid in sealing, an adjustable collar 40 is arranged upon the shaft 22 adjacent the member 38, and this collar is provided with a recess 41 which is engaged by a thumb-screw 42 carried by a lateral projection 43 of the member 38. The collar 40 is also secured to the shaft by means of a set-screw 44. When the weighing receptacle is empty, the weight 27 occupies the position shown in full lines in Fig. 1, and acts to oppose the closing of the cut-off gate. However, when the cut-off gate is nearly closed, the weight acts to assist in the final closing movement. Thus, by adjusting the weight longitudinally of the bracket, the speed with which the gate closes may be varied.

It is essential to the successful operation of scales in which the grain automatically controls the weighing operation that vibration of the scale parts be prevented. Thus when grain is discharged into the receptacle, since the weighing beam is at rest, there is a tendency for the beam to suddenly rise when the material in the receptacle overcomes the weight of the counter-poise. To prevent this objection, means is provided for assisting in the initial upward movement of the scale beam, arranged to become inoperative after the beam has risen to a predetermined point.

As shown, 45 is a bracket secured to the scale frame having spaced bearings 46 and 47, the latter bearing being carried by an arm 48 of the bracket.

49 designates a shaft journaled in the bearing portions, and 50 a weighted arm adjustably secured to the outer end of shaft 49. Arranged upon the latter intermediate the bearing portions 46 and 47 is a sleeve 51, which is held in its adjusted position upon the shaft by means of a lock bolt 52, and serves to prevent longitudinal movement of the shaft in relation to its bearings. Members 53 and 54 extend laterally from the sleeve in angular relation to each other, the former carrying a shank 55 having upon its outer end an anti-friction roll 56, which is positioned to engage the under side of the counterpoised end of the weighing beam, and the latter a small counterweight 57. The shank 55 has a screw-threaded engagement with the member 53, and is locked in its different positions of adjustment by means of a nut 58. The tendency of the weighted arm 50 is to raise the shank carrying the roller 56, but the upward movement of the roller is limited by a stop 59 carried by the member 54 arranged to engage the arm 48 of the bracket. When the scale is empty the roll is in the position shown in full lines in Fig. 7, and during the initial movement of the beam under a load assists in raising the beam. After the latter has moved upward to a predetermined position, the stop 59 engages the arm 48, which permits the beam to pass out of engagement with the roll, as shown in dotted lines in Fig. 7. The roll 56 serves also as a yielding stop, and tends to retard the downward movement of the weighing beam.

In order to prevent the stop upon the cut-off gate from striking the end of lever 19 with too great force, a momentum arrester is provided for the cut-off gate. This momentum arrester consists of an arm 60 fixed to the shaft 22 and having a roller 60′ at its free end for engaging the cam face 72 of a gravity member 71 pivotally carried by a weighted bell-crank lever, pivoted within a support 62 upon the frame. One arm 63 of the bell-crank has its outer end arranged within a loop 64 of a shank 65, which has a limited free sliding movement within a guide 66 upon the frame, a shoulder 67 and a cotter pin 68 serving to limit the movement of the shank within the guide. 69 designates a weight adjustably mounted upon the arm 63. The other arm of the bell-crank is composed of a bifurcated bracket 70 and the gravity member 71 pivoted between the bifurcations of the bracket. The member 71 is held against movement in relation to the bracket 70 in the direction in which the arm 60 moves during the closing of the cut-off gate by means of a stop 73, but is free to rock in relation to the bracket in the opposite direction. During the closing of the cut-off gate, the roller 60' engages the incline 72 and rocks the weighted bell-crank. When the gate approaches its dribbling position, the outer end of the arm 63 abuts against the top of the loop 64 and raises the shank member, adding the weight thereof to the arm 63, thereby increasing the retarding action upon the arm 60. Upon a further movement of the gate toward its closed position, the roller 60' passes over the incline and the bell-crank returns to its normal position. As the gravity member is free to rock in the direction the arm 60 moves during the opening of the cut-off gate, the bell-crank lever is not lifted during the return of the scale parts to their normal relation.

As it is desirable to lock the roller 33 either in or out of operative relation to the bell-crank 31, the lever 36 is provided with a weighted arm 74 pivoted at 75 to an extension 76 of the lever. When extended, the weight tends to retain the slide at its outer limits of adjustment, in which relation the roll 33 is out of the path of the bell-crank 31. In the folded position of the weighted arm 74, as shown in full lines in Fig. 1, the weight holds the slide in position for the roll 33 to engage the lever 31, so as to effect the automatic tripping of the discharge gate. The weighted arm 74 is provided with a lug 77 adapted to engage the lever 36 for limiting the folding movement thereof in relation to the lever, while the connection between the weighted arm and the extension 76 is such as to limit the relative movement between the members when the weight is extended.

What I claim as my invention is,—

1. In a scale, the combination with the frame and the scale beam, of a bracket upon the frame, a shaft journaled in the bracket, an arm fixed to the shaft, a roll upon the arm engaging the beam, a weight attached to the shaft, and a stop carried by the shaft adapted to engage the bracket, for the purpose described.

2. In a scale, the combination with the frame and a scale beam, of a bracket, a shaft journaled in said bracket, a sleeve upon the shaft having arms extending transversely therefrom and angularly in relation to each other, a roll upon one arm for engaging the beam, a counterweight carried by the other arm, a weight fixed to the shaft, and a stop carried by the sleeve adapted to engage the bracket, for the purpose described.

3. In an automatic scale, the combination with a cut-off gate, of a shaft by which said gate is pivotally suspended, a collar and a bracket arranged upon the shaft, a weight carried by said bracket, and a connection between the bracket and the collar.

4. In an automatic scale, the combination with a cut-off gate, of a shaft by which said gate is pivotally suspended, a collar and a bracket arranged upon the shaft, said bracket having an arm connected to the collar, and a weight carried by said bracket.

5. In an automatic scale, the combination with a cut-off gate, of a shaft by which said gate is pivotally suspended, a collar and a bracket arranged upon the shaft, said bracket having a transversely extending portion, a connection between said portion and the collar, and a weight carried by said bracket.

6. In an automatic scale, the combination with a cut-off gate, of a shaft by which said gate is pivotally suspended, and a U-shaped bracket having one leg operatively connected to the shaft, and a weight upon the other leg of the bracket.

7. In an automatic scale, the combination with a cut-off gate, of a shaft by which said gate is pivotally suspended, a collar, a U-shaped bracket having one leg operatively connected to the shaft and to said collar, and a weight upon the other leg of the bracket.

8. In an automatic weighing scale, the combination with the receptacle having two compartments, of a gate for the discharge end of the receptacle adapted to alternately open and close the chambers, a member connected to the gate having shoulders, a pawl engaging said shoulders alternately, a lever for holding the pawl in engagement with said shoulders, a stop, an actuating lever for moving said stop into and out of operative relation to said first-mentioned lever, and a weighted extension pivoted to said actuating lever, acting to retain the lever in its different positions of adjustment.

9. In a scale, the combination with a stationary hopper, of a moving cut-off gate therefor, means operating after the initial closing movement of the gate for retarding the closing thereof.

10. In a scale, the combination with a stationary hopper of a moving cut-off gate therefor, and means operating after the initial closing movement of the gate for yieldably retarding the closing thereof.

11. In a scale, the combination with the cut-off gate and the shaft by which it is pivotally suspended, of an arm fixed to the shaft, and means engaging said arm for retarding the movement thereof.

12. In a scale, the combination with the cut-off gate and the shaft by which it is pivotally suspended, of a weighted member mounted for rocking movement, and means movable with the gate positioned to engage said weighted lever, for the purpose described.

13. In a scale, the combination with the cut-off gate and the shaft by which it is pivotally suspended, of an arm fixed to the shaft, and a bell-crank lever carrying an inclined surface arranged in the path of said arm, for the purpose described.

14. In a scale, the combination with the cut-off gate and the shaft by which it is pivotally suspended, of an arm fixed to the shaft, and a pivoted bell-crank lever, one arm of said bell-crank being provided with a member having an inclined surface positioned in the path of said arm, said member being held against movement in one direction but free to rock in the opposite direction, for the purpose described.

15. In a scale, the combination with the cut-off gate, of means for retarding the closing thereof, and means for increasing the retarding action upon the gate when the latter approaches its closed position.

16. In a scale, the combination with the cut-off gate, of a bell-crank lever carrying an inclined surface upon one arm and a weight upon the other, a projection mounted to move with said gate positioned to engage said incline, and adapted to rock said lever, and a weight added to said lever after a partial movement thereof.

In testimony whereof I affix my signature in presence of two witnesses.

JOHN LOWELL JENKINS.

Witnesses:
R. M. STENSON,
E. B. HARRINGTON.

Copies of this patent may be obtained for five cents each, by addressing the "Commissioner of Patents, Washington, D. C."